(12) United States Patent
Raghuram et al.

(10) Patent No.: US 9,774,602 B2
(45) Date of Patent: *Sep. 26, 2017

(54) REMOTE TRUST ATTESTATION AND GEO-LOCATION OF SERVERS AND CLIENTS IN CLOUD COMPUTING ENVIRONMENTS

(71) Applicant: Intel Corporation, Santa Clara, CA (US)

(72) Inventors: Yeluri Raghuram, San Jose, CA (US); Sudhir Bangalore, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/998,081

(22) Filed: Dec. 24, 2015

(65) Prior Publication Data

US 2016/0134636 A1 May 12, 2016

Related U.S. Application Data

(63) Continuation of application No. 13/421,437, filed on Mar. 15, 2012, now Pat. No. 9,256,742, which is a
(Continued)

(51) Int. Cl.
*G06F 17/00* (2006.01)
*H04L 29/06* (2006.01)
(Continued)

(52) U.S. Cl.
CPC ........ *H04L 63/101* (2013.01); *G06F 9/45558* (2013.01); *G06F 21/44* (2013.01);
(Continued)

(58) Field of Classification Search
CPC ............... H04L 63/101; G06F 9/45558; G06F 2009/45595; G06F 2009/45587
See application file for complete search history.

(56) References Cited

U.S. PATENT DOCUMENTS

| 7,941,379 B1 | 5/2011 | Newstadt et al. |
| 8,156,298 B1 | 4/2012 | Stubblefield |

(Continued)

FOREIGN PATENT DOCUMENTS

| CN | 101009562 A | 8/2007 |
| CN | 10231603 A | 1/2012 |

(Continued)

OTHER PUBLICATIONS

International Search Report and Written Opinion received for PCT Patent Application No. PCT/US2012/023188, mailed on Oct. 29, 2012, 8 pages.
International Search Report and Written Opinion received for PCT Patent Application No. PCT/US2013/023623, mailed on May 15, 2013, 9 pages.
(Continued)

*Primary Examiner* — Mohammed Waliullah
(74) *Attorney, Agent, or Firm* — Jordan IP Law, LLC

(57) ABSTRACT

Methods and systems may provide for selecting a hypervisor protocol from a plurality of hypervisor protocols based on a communication associated with a remote agent. The selected hypervisor protocol may be used to conduct a trust analysis of one or more digitally signed values in the communication, wherein a cloud attestation request may be processed based on the trust analysis. Processing the cloud attestation request may involve generating a trustworthiness verification output, a geo-location verification output, etc., for a cloud computing node corresponding to the remote agent.

16 Claims, 3 Drawing Sheets

Related U.S. Application Data continuation-in-part of application No. PCT/US2012/023188, filed on Jan. 30, 2012.

(51) Int. Cl.
*G06F 21/57* (2013.01)
*G06F 21/44* (2013.01)
*G06F 9/455* (2006.01)

(52) U.S. Cl.
CPC .... *G06F 21/57* (2013.01); *G06F 2009/45587* (2013.01); *G06F 2009/45595* (2013.01)

(56) References Cited

U.S. PATENT DOCUMENTS

| | | | |
|---|---|---|---|
| 8,950,007 B1* | 2/2015 | Teal | G06F 21/57 726/30 |
| 2003/0131238 A1 | 7/2003 | Vincent | |
| 2010/0085984 A1 | 4/2010 | Shin et al. | |
| 2010/0246443 A1 | 9/2010 | Cohn et al. | |
| 2011/0072486 A1 | 3/2011 | Hadar et al. | |
| 2011/0075674 A1 | 3/2011 | Li et al. | |
| 2011/0153727 A1 | 6/2011 | Li | |
| 2011/0225624 A1 | 9/2011 | Sawhney et al. | |
| 2011/0231614 A1 | 9/2011 | Spracklen | |
| 2011/0271270 A1 | 11/2011 | Bowen | |
| 2011/0302415 A1 | 12/2011 | Ahmad et al. | |
| 2012/0005346 A1 | 1/2012 | Burckart et al. | |
| 2013/0117848 A1* | 5/2013 | Golshan | G06F 21/53 726/23 |
| 2013/0191643 A1* | 7/2013 | Song | H04L 9/3247 713/176 |
| 2014/0109191 A1 | 4/2014 | Raghuram et al. | |

FOREIGN PATENT DOCUMENTS

| | | |
|---|---|---|
| CN | 102334111 A | 1/2012 |
| KR | 10-2011-0051028 A | 5/2011 |
| TW | 201145936 A1 | 12/2011 |
| WO | 2013/115776 A1 | 8/2013 |
| WO | 2013/116214 A1 | 8/2013 |

OTHER PUBLICATIONS

Office Action for U.S. Appl. No. 13/421,437, mailed Sep. 5, 2013, 18 pages, United States Patent and Trademark Office.
Office Action for U.S. Appl. No. 13/421,437, mailed Feb. 24, 2014, 14 pages, United States Patent and Trademark Office.
Office Action for U.S. Appl. No. 13/421,437, mailed Jul. 28, 2014, 18 pages, United States Patent and Trademark Office.
International Preliminary Report on Patentability and Written Opinion received for PCT Patent Application No. PCT/US2012/023188, mailed on Aug. 14, 2014, 5 Pages.
International Preliminary Report on Patentability and Written Opinion received for PCT Patent Application No. PCT/US2013/023623, mailed on Aug. 14, 2014, 6 Pages.
Advisory Action for U.S. Appl. No. 13/421,437, mailed Nov. 13, 2014, 3 pages, United States Patent and Trademark Office.
Office Action received for U.S. Appl. No. 13/997,930, mailed on Mar. 3, 2015, 18 pages, United States Patent and Trademark Office.
Notice of Allowance for U.S. Appl. No. 13/421,437, mailed on Sep. 30, 2015, 11 pages, United States Patent and Trademark Office.
Antonio Celesti et al., "A Remote Attesation Approach for a Secure Virtual Machine Migration in Federated Cloud Environments", Network Cloud Computing and Applications, Nov. 21, 2011, 8 pages, 2011 First International Symposium, University of Messina, Italy.
Extended European Search Report for European Patent Application 12867592.3, dated Sep. 2, 2015, 7 pages.
Wang-Han-Zhang et al., "An Iimproved trusted cloud computing platform model based on DAA and privacy CA scheme", Computer Application and System Modeling, Oct. 22, 2010, 7 pages.
Karyn Benson et al., "Do you know where your cloud files are?", Cloud Computing Security Workshop, Oct. 21, 2011, 10 pages, Chicago, Illinois, USA.
Extended European Search Report for European Patent Application 13744281.0, dated Aug. 26, 2015, 9 pages.
Office Action for Taiwanese Patent Application No. 102102900, dated Jul. 1, 2015, 11 pages, includes 6 pages of English translation.
Final Office Action received for U.S. Appl. No. 13/997,930, mailed Sep. 14, 2015, 23 pages, United States Patent and Trademark Office.
Advisory Action received for U.S. Appl. No. 13/997,930, mailed Dec. 17, 2015, 4 pages, United States Patent and Trademark Office.
Office Action for U.S. Appl. No. 13/997,930, dated on Jul. 29, 2016, 29 pages.

* cited by examiner

REMOTE TRUST ATTESTATION AND GEO-LOCATION OF SERVERS AND CLIENTS IN CLOUD COMPUTING ENVIRONMENTS

CROSS-REFERENCE TO RELATED APPLICATIONS

The present application is a continuation of co-pending U.S. patent application Ser. No. 13/421,437, filed on Mar. 15, 2012, which is a continuation-in-part of PCT Application No. PCT/US2012/023188 filed on Jan. 30, 2012.

BACKGROUND

Technical Field

Embodiments generally relate to cloud computing. More particularly, embodiments relate to enabling remote device trust attestation and geo-location functionality in cloud computing environments.

Discussion

While cloud computing may provide opportunities to end users with respect to processing power and flexibility, certain aspects of conventional cloud computing solutions may present challenges from a security standpoint. For example, determining the trustworthiness and/or location of cloud computing resources in a secure and foolproof way is difficult, particularly when those resources employ different operating systems (OSs) and virtual machine manager (VMM) protocols. Indeed, an inability to provide sufficient security measures may hinder the adoption of cloud computing by a wide variety of industries.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
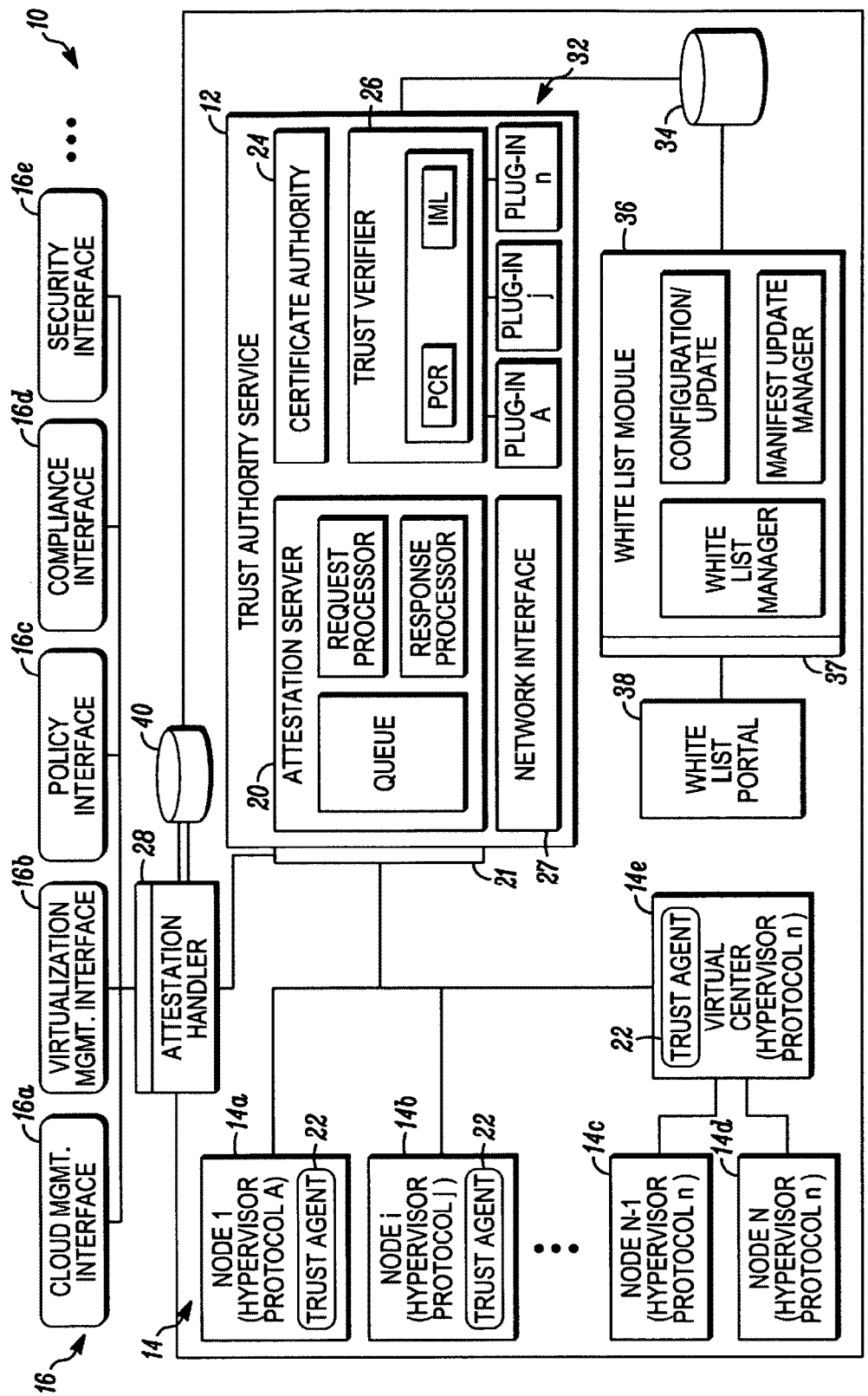
FIG. 1 is a block diagram of an example of a remote trust attestation architecture according to an embodiment.

Turning now to FIG. 1, a remote trust attestation architecture 10 for a cloud computing solution is shown. In the illustrated example, a trust authority service 12 is configured to verify the trustworthiness and/or geographic location (e.g., geo-location) of various cloud computing nodes 14 (14a-14e) and attest to such trustworthiness (or lack thereof) and/or geo-location to one or more inquiring applications 16 (16a-16e). For example, the trust authority service 12 may use an attestation handler 18 to receive cloud attestation requests from one or more of the inquiring applications 16, conduct a trust analysis with respect to one or more of the cloud computing nodes 14, and return a verification result/output based on the trust analysis. The cloud attestation requests, which may include trustworthiness and/or geo-location inquiries, may be received from a cloud management interface 16a, a virtualization management interface 16b, a policy interface 16c (e.g., HyTrust Appliance), a compliance interface 16d (e.g., governance, risk and compliance/GRC), a security interface 16e (e.g., security information and event management/SIEM solution from NitroSecurity, ArchSight, etc.), and so forth. For example, the compliance interface 16d could be used to verify that the cloud computing nodes 14 comply with one or more GRC requirements, etc. Moreover, the attestation handler may use one or more application programming interfaces (APIs) 28 to receive the cloud attestation requests from the inquiring applications 16 and output the verification results to the inquiring applications 16. In one example, the APIs 28 include representational state transfer (REST) APIs.

The cloud computing nodes 14, may include various servers, network devices, client devices, and so forth, wherein the nodes 14 may employ different operating system (OS) and/or hypervisor (e.g., VMM) protocols. In the illustrated example, a first node ("Node 1") 14a uses a first hypervisor protocol (e.g., "hypervisor protocol A") to manage a virtual machine environment on the first node 14a, a second node ("Node i") 14b uses a second hypervisor protocol (e.g., "hypervisor protocol j") to manage a virtual machine environment on the second node 14b, a third node ("Node N−1") 14c uses a third hypervisor protocol (e.g., "hypervisor protocol n") to operate a virtual machine environment on the third node 14c, and a fourth node ("Node N") 14d uses the third hypervisor protocol to operate a virtual machine environment on the fourth node 14d. The third and fourth nodes 14c, 14d, may be managed by another node 14e that is also configured to use the third hypervisor protocol (e.g., "hypervisor protocol n"). As will be discussed in greater detail, each cloud computing node 14 may be associated with a trust agent 22 configured to provide the trust authority service 12 with information to be used in the trust analysis, per the Trusted Computing Group's Remote Attestation Protocol.

Example hypervisor protocols include, but are not limited to, ESXi (ESXi 5.0, VMware, August 2011), KVM (kernel-based virtual machine, e.g., SUSE KVM for Linux 2.6.20, February 2007), Xen (e.g., Red Hat Xen for Linux v2.6.37, March 2011), and so forth. Additionally, each hypervisor protocol may enable the deployment of multiple virtual machines in various different operating systems including, but not limited to, Windows, Linux and Mac operating systems. The Attestation mechanism would work seamlessly to attest to the Trust of Virtual Machines once we have virtual TPMs (trusted platform modules).

In the illustrated example, the trust authority service 12 includes one or more REST APIs 21 attestation server logic 20 that receives digitally signed communications (e.g., secure sockets layer/SSL communications) from the trust agents 22, wherein a certificate authority 24 may be used to verify digital signatures. In addition, the illustrated trust authority service 12 includes a trust verifier 26 that is configured to conduct the trust analysis on a per-hypervisor protocol basis. For example, the trust verifier 26 may select a protocol specific plug-in from a plurality of protocol specific plug-ins 32 and use the selected protocol specific plug-in 32 to conduct a trust analysis of one or more digitally signed values in the communications from the trust agents 22. In particular, the digitally signed values may include platform configuration register (PCR) values such as geo-location values, software hashes (e.g., SHA-Hash values), integrity measurement log (IML) values such as measurement sequence and boot log information, etc., wherein the trust analysis may involve comparing the digitally signed values with one or more known values.

In this regard, the illustrated architecture 10 also includes a white list repository 34 and a white list module 36 that uses one or more REST APIs to receive the known values via a white list portal 38 and populates the white list repository 34 with the known values. The known values may be determined, for example, by running the cloud computing node 14 in a controlled IT (information technology) environment, and identifying the current measurements, wherein such values may also be stored to a secure PCR of the cloud computing node 14 for use at run-time. The "golden" or "goodknown" module hashes may also be obtained from a VMM/OS vendor via an appropriate update manager subsystem.

Thus, the trust verifier 26 may retrieve the known values from the white list repository 34 according to the cloud computing node 14 in question, and compare the digitally signed values in the communications to the known values. For example, the comparison may be conducted with respect to one or more hypervisor/OS hash values in order to determine whether the source of the incoming communication is in fact associated with a trusted cloud computing node 14. In another example, the comparison may be conducted with respect to one or more geo-location values (e.g., comparing the digitally signed geo-location value in a communication to a map) in order to determine the location of the source of the incoming communication.

The illustrated attestation server logic 20 communicates the result of the trust analysis to the attestation handler 18, which may output the result as a response to the cloud attestation request. The attestation handler 18 may also use a trust cache 40 to process the cloud attestation request, wherein the trust cache 40 may include time stamped trustworthiness/geo-location data that may accelerate the attestation process. For example, the attestation handler 18 may access the trust cache 40 and determine that a trustworthiness and/or geo-location validation response has recently been generated for the cloud computing node 14 in question, and use the result from the trust cache 40 instead of and/or in addition to the result from the trust authority service 12.

The trust authority service 12 may be implemented on, for example, a personal computer (PC), server, workstation, laptop, personal digital assistant (PDA), wireless smart phone, media player, imaging device, mobile Internet device (MID), any smart device such as a smart phone, smart tablet, and so forth, or any combination thereof. Thus, the trust verifier 26, attestation server logic 20 and certificate authority 24 may incorporate certain hardware elements such as, for example, a processor, controller and/or chipset, memory structures, busses, etc. In addition, the illustrated trust authority service 12 uses a network interface 27 to exchange communications with the cloud computing nodes 14 and/or inquiring applications 16, as appropriate. For example, the network interface 27 could provide off-platform wireless communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006), Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) telephony purposes. The network interface 27 may also provide off-platform wired communication (e.g., RS-232 (Electronic Industries Alliance/EIA), Ethernet (e.g., IEEE 802.3-2005), power line communication (e.g., X10, IEEE P1675), USB (e.g., Universal Serial Bus, e.g., USB Specification 3.0, Rev. 1.0, Nov. 12, 2008, USB Implementers Forum), DSL (digital subscriber line), cable modem, T1 connection, etc., functionality.

Figure 2:
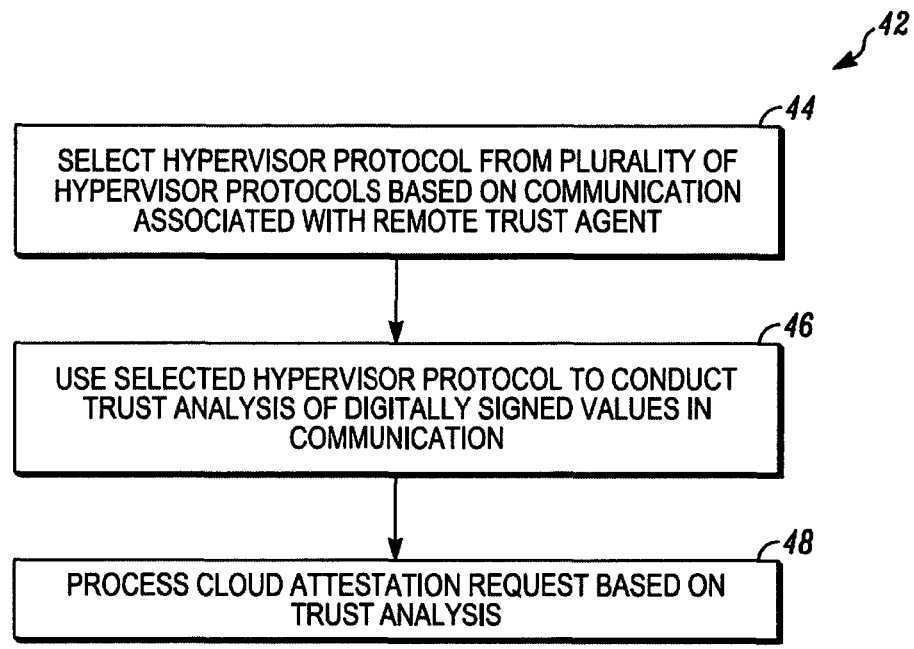
FIG. 2 is a flowchart of an example of a method of operating a trust authority service according to an embodiment.

FIG. 2 shows a method 42 of operating a trust authority service. The method 42 may be implemented in a trust authority service such as the trust authority service 12 (FIG. 1), already discussed, as a set of executable logic instructions stored in at least one machine- or computer-readable storage medium such as random access memory (RAM), read only memory (ROM), programmable ROM (PROM), flash memory, firmware, microcode, etc., in configurable logic such as programmable logic arrays (PLAs), field programmable gate arrays (FPGAs), complex programmable logic devices (CPLDs), in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 42 may be written in any combination of one or more programming languages, including an object oriented programming language such as C++ or the like and conventional procedural programming languages, such as the "C" programming language or similar programming languages. Moreover, various aspects of the method 42 could be implemented as embedded logic of a processor using any of the aforementioned circuit technologies.

Illustrated processing block 44 selects a hypervisor protocol from a plurality of hypervisor protocols based on a communication associated with a remote trust agent. The selected hypervisor protocol may be used at block 46 to conduct a trust analysis one or more digitally signed values in the communication. In one example, the trust analysis includes comparing the digitally signed values to one or more known values, as already discussed. Thus, if a communication is received from a device masquerading as a trusted cloud computing node, the process at block 46 may determine that the digitally signed values in the communication do not correspond to/match the known values. In addition, block 48 may process a cloud attestation request based on the trust analysis. Thus, if it has been determined that the digitally signed values do not correspond to/match the known values, block 48 may involve generating an output indicating that the device in question is not trustworthy. In another example, the illustrated method 42 may attest to/output a trusted geo-location value for the remote device in question.

Figure 3:
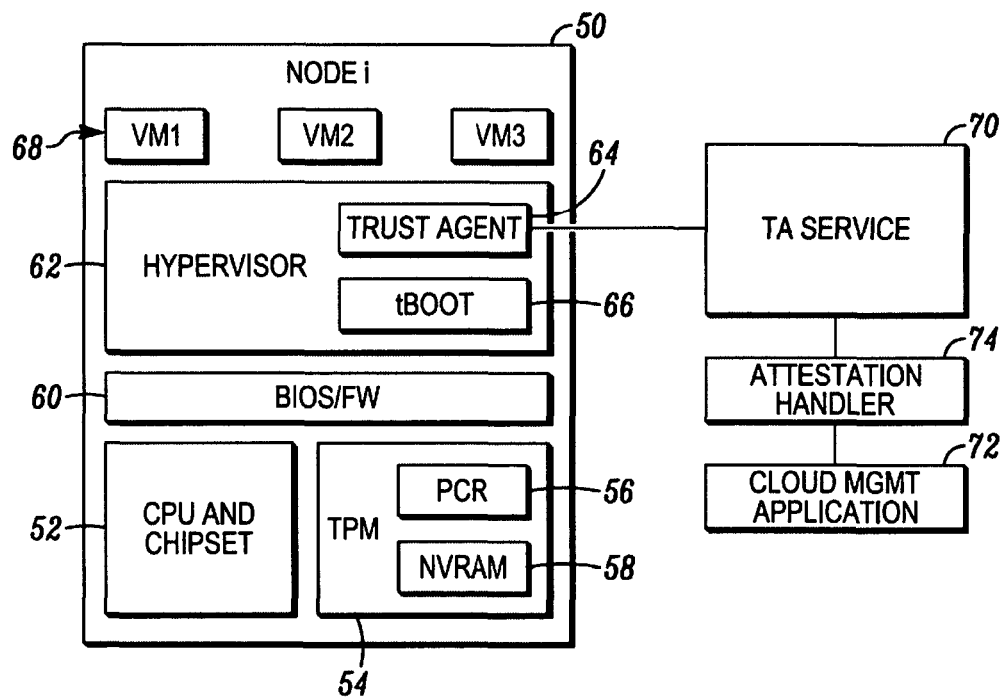
FIG. 3 is a block diagram of an example of a cloud computing node according to an embodiment.

Turning now to FIG. 3, an example of a cloud computing node ("Node i") 50 is shown. The illustrated cloud computing node 50, which may include a server, network device, client device, etc., may be readily substituted for one or more of the nodes 14 (FIG. 1), already discussed. In the illustrated example, a hardware layer of the node 50 includes a central processing unit (CPU) and chipset 52, as well as a trusted platform module (TPM) 54 having a PCR 56 and non-volatile RAM (NVRAM) 58. A software stack of the node 50 may include a basic input/output system (BIOS)/firmware (FW) layer 60 and a hypervisor layer 62 having a trust agent 64 and trusted boot ("tboot") code 66. The trust agent 64 may have functionality similar to that of the trust agents 22 (FIG. 1), already discussed. The illustrated node 50 also includes a plurality of virtual machines 68, wherein two or more of the virtual machines 68 may use s different OS.

Once the illustrated CPU and chipset 52, and TPM 54 are provisioned correctly (e.g., for trusted execution, geo-location, etc.), the illustrated tboot code 66 may populate the PCR 56 with geo-location values and other software hashes, wherein the trust agent 64 may retrieve the information from the PCR 56, digitally sign it, and transmit it as a communication to a trust authority service 70. The trust authority service 70, which may include functionality similar to that of the trust authority service 12 (FIG. 1), already discussed, may then use the digitally signed values to respond to one or more cloud attestation requests from a cloud management application 72, via an attestation handler 74. Thus, the illustrated cloud management application 72 may have functionality similar to that of one or more of the inquiring applications 16, already discussed.

Figure 4A:
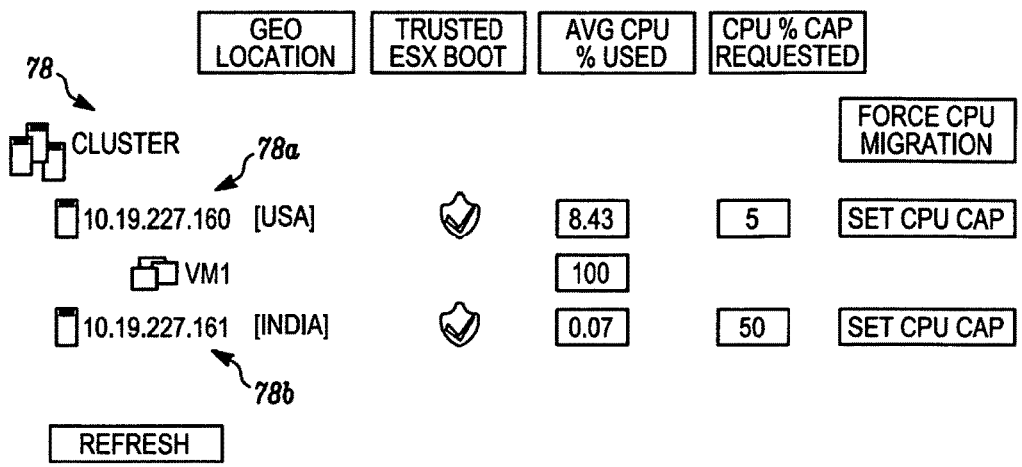
FIGS. 4A and 4B are screen shots of example interfaces having location verification outputs according to embodiments.
Figure 4B:
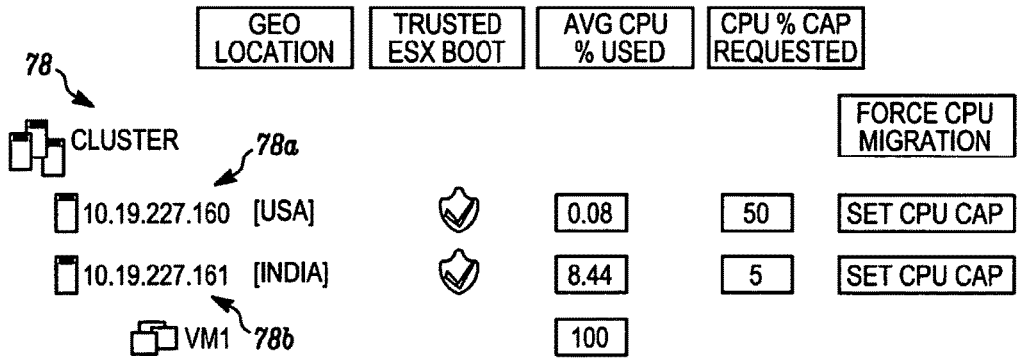

FIG. 4A shows an interface 76 in which a set of virtual clusters 78 (78a, 78b) in a cloud computing infrastructure are labeled with geo-location information obtained from trust agents associated with the clusters 78. The interface 76 may therefore be output to a user via an application such as, for example, one or more of the inquiring applications 16 (FIG. 1) or the cloud management application 72 (FIG. 3), in response to a geo-location based trust analysis. In the illustrated example, it has been determined that a first cluster 78a running a particular virtual machine (VMI) is located in the United States of America (USA) and a second cluster 78b is located in India. FIG. 4B shows an interface 80 that may result from an attempt to migrate the virtual machine from the first cluster 78a to the second cluster 78b in an environment having a policy (e.g., governmental risk and compliance) that requires all cloud computing resources to be physically located in the USA. In particular, the illustrated interface 80 includes a warning message 82 indicating that the proposed migration violates the geo-location compliance policy that is in place.

Embodiments may therefore involve a method of operating a trust authority service in which a hypervisor protocol is selected from a plurality of hypervisor protocols based on a communication associated with a remote trust agent. The selected hypervisor protocol may be used to conduct a trust analysis of one or more digitally signed values in the communication. In addition, the method may provide for processing a cloud attestation request based on the trust analysis. In one example, processing the cloud attestation request includes generating a trustworthiness verification output for the cloud computing node.

In one example, selecting the hypervisor protocol from a plurality of hypervisor protocols includes selecting a protocol specific plug-in.

In another example, the method further includes retrieving one or more known values from a white list repository, wherein the trust analysis includes comparing the one or more digitally signed values to the one or more known values. The method may also include receiving the one or more known values via a white list portal, and populating the white list repository with the one or more known values. In addition, the one or more known values and the one or more digitally signed values include one or more of register values and log data.

In another example, the method further includes receiving the communication from a cloud computing node associated with the remote trust agent, wherein processing the cloud attestation request includes generation of a trustworthiness verification output for the cloud computing node. Additionally, the communication may be received from one or more of a server, a network device and a client device.

In another example, the method further includes receiving the cloud attestation request via one or more of a cloud management interface, a virtualization management interface, a policy interface, a compliance interface, and a security interface.

In another example, processing the cloud attestation request includes accessing a trust cache.

Embodiments may also include at least one machine readable medium comprising a plurality of instructions that in response to being executed on a computing device, cause the computing device to carry out any of the examples of the aforementioned method, an apparatus for operating a trust authority service, configured to perform any of the examples of the aforementioned method, and a system for operating a trust authority service, comprising a network interface and a chipset configured to perform the method of any of the examples of the aforementioned method.

Embodiments may also include at least one computer accessible and/or machine readable storage medium having a set of instructions which, if executed by a processor, cause a computing device to select a hypervisor protocol from a plurality of hypervisor protocols based on a communication associated with a remote trust agent. The instructions may also cause a computing device to use the selected hypervisor protocol to conduct a trust analysis of one or more digitally signed values in the communication, and process a cloud attestation request based on the trust analysis. In one example, processing the cloud attestation request includes generating a trustworthiness verification output for the cloud computing node.

Other embodiments may involve a method of operating a trust authority service in which one or more known values are received via a white list portal, and a white list repository is populated with the one or more known values. The method may also provide for receiving a communication from a cloud computing node associated with a remote trust agent, and selecting a protocol specific plug-in from a plurality of protocol specific plug-ins based on a hypervisor protocol corresponding to the communication. In addition, the one or more known values may be retrieved from the white list repository, wherein the selected protocol specific plug-in may be used to conduct a trust analysis of one or more digitally signed geo-location values in the communication. In one example, the trust analysis includes comparing the one or more digitally signed geo-location values to the one or more known values, wherein the known values include map data. Moreover, the method may provide for processing a cloud attestation request based on the trust analysis, wherein processing the cloud attestation request includes generating a location verification output for the cloud computing node.

In one example, the communication is received from one or more of a server, a network device and a client device.

In another example, the method further includes receiving the cloud attestation request via one or more of a cloud management interface, a virtualization management interface, a policy interface, a compliance interface, and a security interface.

In another example, processing the cloud attestation request includes accessing a trust cache.

Embodiments may also include at least one machine readable medium comprising a plurality of instructions that in response to being executed on a computing device, cause the computing device to carry out any of the examples of the aforementioned method, an apparatus for operating a trust authority service, configured to perform any of the examples of the aforementioned method, and a system for operating a trust authority service, comprising a network interface and a chipset configured to perform the method of any of the examples of the aforementioned method.

Additionally, embodiments may include an apparatus having a white list repository, and a white list module with a white list portal, wherein the white list module is to receive one or more known values via the white list portal, and populate the white list repository with the one or more known values. The apparatus may also include a trust module having attestation server logic to receive a communication from a cloud computing node associated with a remote trust agent, and a trust verifier to select a protocol specific plug-in from a plurality of protocol specific plug-ins based on a hypervisor protocol corresponding to the communication. The trust verifier may also retrieve the one or more known values from the white list repository, and use the selected protocol specific plug-in to conduct a trust analysis of one or more digitally signed geo-location values in the communication. In one example, the trust analysis includes a comparison of the one or more digitally signed geo-location values to the one or more known values, and the attestation server logic generates a location verification output for the cloud computing node based on the trust analysis.

Embodiments may also include a system having a network interface to identify a communication from a cloud computing node associated with a remote trust agent. The system may also have a chipset with a trust verifier to select a hypervisor protocol from a plurality of hypervisor protocols based on the communication. In addition, the trust verifier may use the selected hypervisor protocol to conduct a trust analysis of one or more digitally signed values in the communication, wherein the chipset further includes attestation server logic to process a cloud attestation request based on the trust analysis.

Techniques described herein therefore provide an approach to remote attestation that is scalable across hundreds/thousands of hosts and devices in multi-OS/multi-hypervisor environments. Such techniques enable trustworthiness determinations to be made prior to dispatching applications and workloads onto hosts, devices and other resources in a cloud computing infrastructure. Moreover, geo-location information may be stored and retrieved in a tamper proof approach that is highly flexible.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. An apparatus comprising:
one or more processors;
a memory in communication with the one or more processors, the memory including a white list repository;
a white list module, in communication with the one or more processors, including a white list portal, the white list module to,
receive one or more known values via the white list portal, and
populate the white list repository with the one or more known values;
a trust module, in communication with the one or more processors, including a trust verifier to select a protocol specific plug-in from a plurality of protocol specific plug-ins based on a hypervisor protocol corresponding to the communication, retrieve the one or more known values from the white list repository, and use the selected protocol specific plug-in to conduct a trust analysis of one or more digitally signed geo-location values in the communication on a per-hypervisor protocol basis, wherein the trust analysis is to include a comparison of the one or more digitally signed geo-location values to the one or more known values; and an attestation handler to receive a cloud attestation request, wherein the attestation handler uses a trust cache to process the cloud attestation request.

2. The apparatus of claim 1, wherein the trust module further includes attestation server logic to receive the communication from a cloud computing node associated with a remote trust agent.

3. The apparatus of claim 2, wherein the attestation server logic is to generate a location verification output for the cloud computing node based on the trust analysis.

4. The apparatus of claim 2, wherein the communication is to be received from one or more of a server, a network device and a client device.

5. The apparatus of claim 1, wherein the cloud attestation request is received via one or more of a cloud management interface, a virtualization management interface, a policy interface, a compliance interface, and a security interface.

6. The apparatus of claim 5, wherein the attestation handler uses the trust cache to process the cloud attestation request.

7. A method comprising:
receiving one or more known values via a white list portal;
populating a white list repository with the one or more known values;
selecting a hypervisor protocol from a plurality of hypervisor protocols based on a communication associated with a remote trust agent, wherein selecting the hypervisor protocol includes selecting a protocol specific plug-in;
using the selected hypervisor protocol to conduct a trust analysis of one or more digitally signed geo-location values in the communication, wherein the trust analysis includes comparing the one or more digitally signed geo-location values to the one or more known values; and
processing a cloud attestation request based on the trust analysis, wherein processing the cloud attestation request includes accessing a trust cache.

8. The method of claim 7, further including retrieving one or more known values from a white list repository to conduct the trust analysis.

9. The method of claim 8, wherein the one or more known values and the one or more digitally signed geo-location values include one or more of register values and trace data.

10. The method of claim 7, further including receiving the communication from a cloud computing node associated with the remote trust agent, wherein processing the cloud attestation request includes generating a trustworthiness verification output for the cloud computing node.

11. The method of claim 10, wherein the communication is received from one or more of a server, a network device and a client device.

12. The method of claim 7, further including receiving the cloud attestation request via one or more of a cloud management interface, a virtualization management interface, a policy interface, a compliance interface, and a security interface.

13. At least one non-transitory computer accessible storage medium comprising a set of instructions which, if executed by a processor, cause a computing device to:
receive one or more known values via a white list portal;
populate a white list repository with the one or more known values;
select a hypervisor protocol from a plurality of hypervisor protocols based on a communication associated with a remote trust agent, wherein selecting the hypervisor protocol includes selecting a protocol specific plug-in;
retrieve the one or more known values from the white list repository;
use the selected hypervisor protocol to conduct a trust analysis of one or more digitally signed geo-location values in the communication on a per-hypervisor protocol basis, wherein the trust analysis is to include a comparison of the one or more digitally signed geo-location values to the one or more known values; and
process a cloud attestation request based on the trust analysis, wherein processing the cloud attestation request includes accessing a trust cache.

14. The medium of claim 13, wherein, if executed, the instructions cause a computing device to generate a location verification output for the cloud computing node based on the trust analysis.

15. The medium of claim 13, wherein the one or more known values and the one or more digitally signed geo-location values are to include one or more of register values and trace data.

16. The medium of claim 13, wherein, if executed, the instructions cause a computing device to receive the communication from a cloud computing node associated with the remote trust agent, wherein processing the cloud attestation request is to include generating a trustworthiness verification output for the cloud computing node.

* * * * *